United States Patent [19]

Grebowiec

[11] Patent Number: 4,497,622
[45] Date of Patent: Feb. 5, 1985

[54] BLOW PIN ASSEMBLY

[75] Inventor: Thaddeus J. Grebowiec, Kansas City, Mo.

[73] Assignee: Brockway-Imco Inc., Richmond, Va.

[21] Appl. No.: 404,413

[22] Filed: Aug. 2, 1982

[51] Int. Cl.³ .................. B29C 17/07; B29C 17/12
[52] U.S. Cl. .................................. 425/525; 264/533; 264/536; 425/527; 425/531; 425/535
[58] Field of Search .............. 425/525, 527, 531, 535; 264/533, 536

[56]  References Cited

U.S. PATENT DOCUMENTS

| | | | |
|---|---|---|---|
| 3,224,038 | 12/1965 | Bubesheim | 425/535 X |
| 3,531,556 | 9/1970 | Mehnert | 425/525 X |
| 3,752,628 | 8/1973 | Hafele et al. | 425/531 |
| 3,971,788 | 11/1975 | Padovani | 264/550 X |
| 4,095,927 | 6/1978 | Roberg et al. | 425/527 X |
| 4,173,447 | 11/1979 | Bradbury | 425/526 |

FOREIGN PATENT DOCUMENTS 53-144966  12/1978  Japan ........................ 264/533

Primary Examiner—Jan Silbaugh
Attorney, Agent, or Firm—Burns, Doane, Swecker & Mathis

[57]  ABSTRACT

This invention relates to a blow pin assembly for use in extrusion blow molding processes to yield thermoplastic containers having a dripless pour lip. The dripless pour lip is achieved by forge forming a portion of the neck moil, which moil is characteristic of extrusion blow molding processes. The shape of the pour lip is dictated by a downwardly facing groove carried by a cutter collar which is part of the blow pin assembly. This groove coacts with a split annular anvil carried by the split blow mold to achieve the necessary forge forming of the container lip. The cutter collar also achieves removal of the excess neck moil material by a shearing action achieved between the outside edge of the groove and the split annular anvil.

6 Claims, 6 Drawing Figures

BLOW PIN ASSEMBLY

BACKGROUND OF THE INVENTION

This invention relates to a blow pin assembly for use in extrusion blow molding processes to yield thermoplastic containers having a dripless pour lip.

In conventional extrusion blow molding procedures, a hot extruded tube of thermoplastic material is captured between the mold halves of a split blow mold. This capture results in the lower end of the tube being pinched off and a portion of the upper end of the tube extending out of the split blow mold. This upper end of the tube is commonly referred to as a neck moil.

After the tube's capture, a blow pin assembly, which includes a blow pin tip, is lowered so that the tip enters into the tube to forge form the neck finish of the soon to be blown container. Also, neck moil removal procedures are contemporaneously initiated when the tip enters the tube. The neck moil removal is accomplished by providing, as part of the blow pin assembly, a cutter collar designed for making shearing contact with an anvil carried by the split blow mold. Since the neck moil is caught between the cutter collar and the anvil, its separation from the container neck finish is effected. Exemplary of such a blow pin assembly is the one described in U.S. Pat. No. 4,173,447.

Besides removal of the neck moil, the cutter collar and anvil also accomplish another function in that they also form the top and outside edge surfaces of the container lip. Conventionally, the top surface is formed in a plane and the outside edge surface is formed as a sharp corner. While such a lip configuration is widely used, it has a tendency to allow dripping when the liquid contents of the container are poured therefrom.

It has been found that this undesirable dripping can be mitigated by providing a lip which has a rounded top surface. Production of such a lip, however, will require a different apparatus than hereinabove described.

Therefore, it is an object of this invention to provide, for use in the extrusion blow molding of thermoplastic containers, a blow pin assembly which provides a rounded container lip and which effects neck moil removal.

THE INVENTION

This invention relates to an apparatus for providing a rounded, dripless pour lip on an extrusion blow molded thermoplastic container. The apparatus features a split annular anvil which is mounted to a split blow mold. The split blow mold defines a hollow mold space and is designed for use in the extrusion blow mold process. The split annular anvil features an upstanding collar which is defined by an annular outside wall and an annular inside wall. The inside diameter of the split annular anvil is defined by the annular inside wall diameter. Connecting the outside wall to the inside wall is a top wall. In a preferred form this top wall slopes downwardly and outwardly from the inside wall to the outside wall.

Coacting with the split annular anvil, there is also provided a blow pin assembly which is reciprocally movable along the vertical axis of the hollow mold space. The blow pin assembly has a blow pin stem having a bore therethrough for the passage of blow air. Mounted to the blow pin stem are a hollow blow pin tip and cutter. The blow pin tip is mounted to the distal end of the blow pin stem while the cutter is mounted at a position above the blow pin tip. The diameter of the blow pin tip is less than the inside diameter of the split annular anvil. A feature of the cutter is its annular downwardly facing groove. This groove is utilized in forming the rounded, dripless pour lip and in removing the neck moil formed by the extrusion blow mold process. Configurationwise, the annular groove has an inside diameter less than the inside diameter of the split annular anvil. The outside diameter of the groove is slightly greater than the diameter of the annular outside wall which forms the beforementioned collar on the split annular anvil. This relationship between the outside edge of the groove and the outside wall of the collar makes possible the shearing of the neck moil from the neck finish when the blow pin assembly is lowered so as to position the blow pin tip within the neck finish defining portion of the hollow mold space. The shearing effect is easily understood when it is considered that the moil is caught between the annular outside collar wall and the downwardly moving outside edge of the groove and that the distance between these two structures is very slight thereby causing the caught neck moil to shear as the blow pin assembly moves downwardly.

To provide the rounded configuration for the dripless pour lip, the groove also features a concave surface which will forge form the rounded part of the pour lip when the blow pin assembly is lowered to position of the blow pin tip within the neck finish portion of the hollow mold space.

In a preferred form, the lowest outsidemost extent of the groove lies in a plane closer to the split annular anvil than the plane in which the lowest insidemost extent of the groove lies. By having the outsidemost extent of the groove extend to a point lower than the insidemost extent, more structure is provided to effect shearing of the neck moil.

These and other features of this invention contributing to satisfaction in use and economy of manufacture will be more fully understood from the following description and accompanying drawings in which identical numerals refer to identical parts and in which.

Referring now to FIGS. 1-6 there can be seen an apparatus of this invention, generally designated by the numeral 10, in association with a split blow mold, generally designated by the numeral 12. Split blow mold 12 comprises two mold halves 42 and 44. As is conventional in the art mold halves 42 and 44 are powered for reciprocal movement towards and away from the center axis defined by the mold cavity which is formed when mold halves 42 and 44 are brought together.

Figure 1:
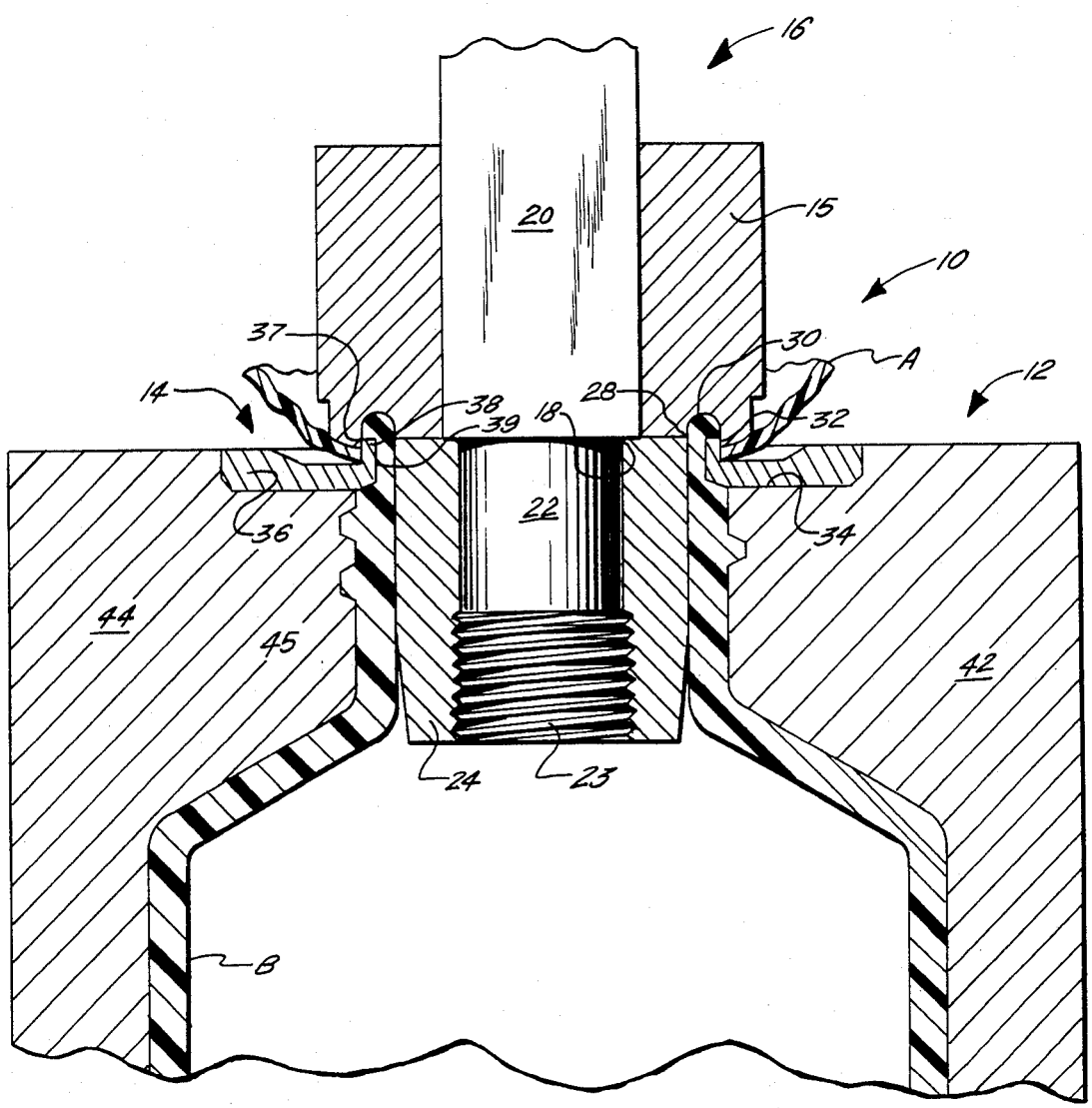
FIG. 1 is a sectional view showing the apparatus of this invention in association with a split blow mold.
Figure 2:
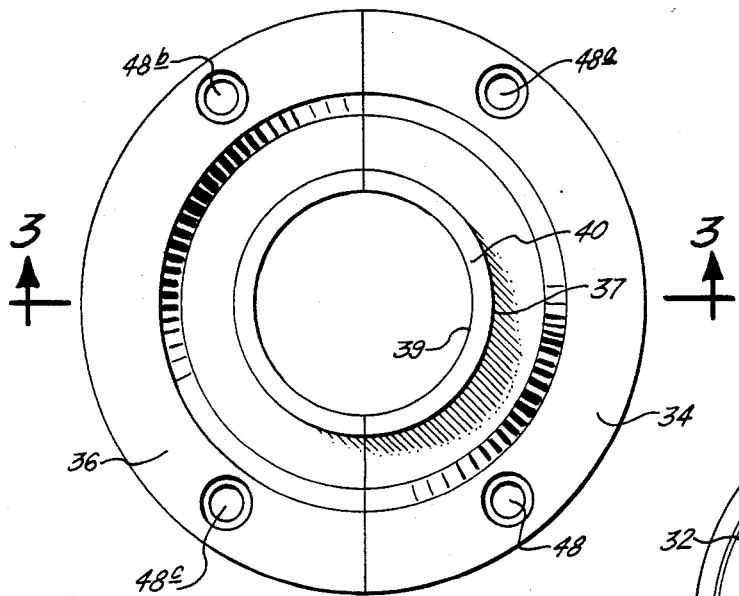
FIG. 2 is a top plan view of the anvil shown in FIG. 1.
Figure 3:
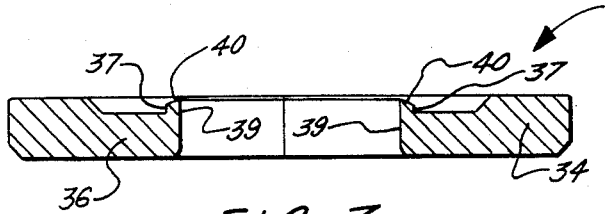
FIG. 3 is a sectional view taken through sectional lines 3—3 in FIG. 2.
Figure 6:
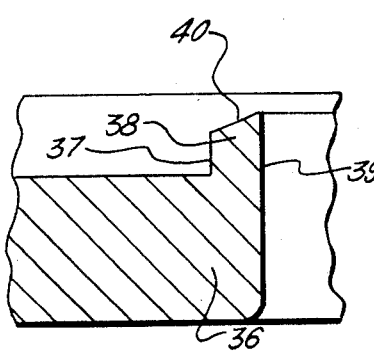
FIG. 6 is an enlarged view of the collar portion of the anvil shown in FIG. 3.

Apparatus 10 comprises a blow pin assembly, generally designated by the numeral 16, and a split annular anvil, generally designed by the numeral 14. Split annular anvil 14 is comprised of two anvil halves 34 and 36, as can be seen in FIGS. 2 and 3. Anvil halves 34 and 36 are mounted to mold halves 42 and 44 respectively by bolting. To facilitate this bolting attachment there is provided bolt bores 48, 48a, 48b, and 48c. Other conventional modes of mounting can also be used. When the split anvil halves are brought together by the closing of mold halves 42 and 44, as shown in FIG. 1, they form together split annular anvil 14 which has an upstanding collar 38 which is defined by annular outside wall 37, annular inside wall 39 and annular top wall 40, which top wall slopes outwardly and downwardly from the uppermost extent of annular inside wall 39 to the uppermost extent of annular outside wall 37. Note that the inside diameter of split annular anvil 14, as defined by annular inside wall 39, is greater than the diameter of blow pin 24, hereinafter described. Both annular outside wall 37 and annular inside wall 39 have diameters less than the diameter of neck finish 45.

Partially positioned within neck finish 45 is blow pin assembly 16. Blow pin assembly 16 features a blow pin stem 18 which has an upper portion 20 and a lower portion 22. Upper portion 20 has a rectangular cross-section while lower portion 22 is circular in cross section. Lower portion 22 also has, at its distal end, threads 23. Blow pin stem 18, for the embodiment shown in the drawings, has a concentric bore therethrough for the passage of blow air.

Figure 4:
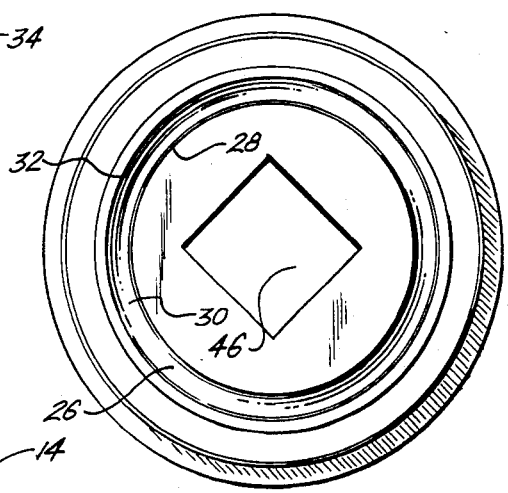
FIG. 4 is a bottom plan view of the cutter shown in FIG. 1.

Slidably mounted onto upper portion 20 of blow pin stem 18 is cutter collar 15. As can be seen in FIG. 4, cutter collar 15 has a rectangular bore 46 therethrough. Rectangular bore 46 is dimensioned to effect slidable mounting of cutter collar 15 to upper portion 20 of blow pin stem 18. By utilizing the rectangular bore and rectangular upper portion 20, it is possible to fixedly mount cutter collar 15 to blow pin stem 18 whereby rotation of blow pin stem 18 effects rotation of cutter collar 15.

Figure 5:
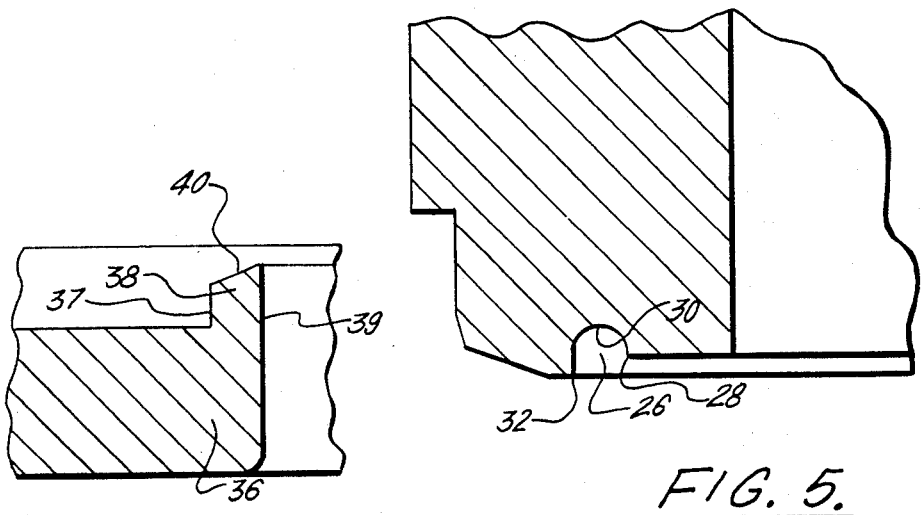
FIG. 5 is an enlarged detailed view of the groove portion of the cutter shown in FIG. 1.

Cutter collar 15 has an annular, downwardly facing groove 26 as shown in FIGS. 1, 4, and 5. Annular groove 26 has an inside edge 28 and an outside edge 32. Also defining groove 26 is concave surface 30. As can be seen in FIGS. 1 and 5, for the embodiment shown, groove 26 has substantially an inverted "U" shape when viewed in axial cross section. Inside edge 28 of groove 30 has a diameter less than the diameter of annular inside wall 39. On the other hand, outside edge 32 has a diameter slightly greater than the diameter of annular outside wall 37. The difference between these diameters should be sufficiently small so that the neck moil will be sheared from the neck when the blow pin assembly moves downwardly to position the blow pin tip into the neck finish portion of the hollow mold cavity. For example, when blow molding an extruded tube of polyvinyl chloride having a wall thickness of 0.100 inches, the difference in diameter should be within the range of from about 0.001 to about 0.003 inches. Also note that, as can be seen in FIGS. 1 and 5 that outside edge 32 is displaced downwardly from inside edge 28. This relationship is preferred as this provides greater wall depth for groove 26 at the point of the neck shearing action between outside edge 32 and outside wall 37.

Threadedly attached to blow pin stem 18 at its lower portion 22 is blow pin tip 24. Blow pin tip 24 has a partially threaded bore for cooperation with thread 23 at the distal end of lower portion 22.

In operation, a hot thermoplastic extruded tube is captured between split blow mold 12 by the closing of mold halves 42 and 44 on the tube. The lower end of the tube is pinched off while the upper end of the tube extends outward of split blow mold 12 to yield a neck moil, labelled by the letter "A" in FIG. 1. Subsequent to the capture of the tube, blow pin assembly 16 is lowered so that blow pin tip 24 forges the hot tube to conform to the shape defined by neck finish 45. As can be seen in FIG. 1, for the embodiment shown, a helical thread is formed on the neck finish. Also, by the lowering of blow pin 24 cutter collar 15 is also lowered thereby bringing groove 26 into contact with neck moil "A". Some of the neck moil will be captured within the cavity defined by groove 26 so that it is forge formed into the shape dictated by the groove. Since groove 26 has concave surface 30, the lip of the container will take on a rounded shape. Contemporaneous with the forge forming of the container lip there is also accomplished removal of neck moil "A" by the shearing action realized when outside edge 32 slides down around annular outside wall 37. To insure a high fidelity separation of neck moil "A" from container "B", blow pin stem 18 can be rotated back and forth thereby causing a rotative shearing action between outside edge 32 and annular outside wall 37. Subsequent to or contemporaneously with the above described lip formation and the neck moil removal, blow air can be introduced into the extruded tube via the concentric bore of blow pin stem 18 to blow form bottle "B".

It has been found advantageous to have annular outside wall 37 with a diameter smaller than the outside diameter of neck finish 45 for the reason that the split annular anvil will project to some extent under the rounded lip being formed so that structural support is provided for the forge forming of the lip.

For the embodiment shown in the drawings, annular top wall 40 is downwardly and outwardly sloped from annular inside wall 39 to annular outside wall 37. Other configurations, however, can be used. For example, annular top wall 40 may be a planar horizontal wall which, of course, would require that annular outside wall 37 and annular inside wall 39 to be coextensive at their uppermost extent. Also, annular top wall 40 may be an arcuate wall extending from the uppermost extent of annular inside wall 39 and smoothly joining annular outside wall 37.

I claim:

1. An apparatus for providing a rounded, dripless pour lip on a thermoplastic container blow molded from an extruded tube, said apparatus comprising:

A. a split annular anvil having an upstanding collar said collar being defined by an annular outside wall, a single annular inside wall, which is concentric with said split annular outside wall, and a sloping top wall downwardly and outwardly connecting said annular outside wall to said annular inside wall, and said split annular anvil being mounted to a split blow mold, which split blow mold defines a hollow mold space including a neck finish defining portion and which is adapted for the capture of and the blow molding of said extruded tube, a. said annular outside wall of said split annular anvil and said annular inside wall of said split annular anvil both having a diameter that is less than the diameter of said neck finish defining portion of said blow mold whereby said dripless pour lip on said container has an outside diameter less than the outside diameter of the neck finish portion of said container;

B. a blow pin assembly reciprocally movable along the vertical axis of said hollow mold space, said blow pin assembiy comprising, i. a blow pin stem having a bore for the passage of blow air therethrough, ii. a hollow blow pin tip mountable to the distal end of said blow pin stem and having an outside diameter less than said inside diameter of said split annular anvil, and iii. a cutter mounted to said blow pin stem at a position above said blow pin stem and said blow pin tip, said cutter having an annular downwardly facing groove which has, a. an inside diameter less than said inside diameter of said split annular anvil, and an outside diameter slightly greater than the diameter of said annular outside wall, whereby, said groove at its outside diameter is in neck moil shearing relationship with said annular mold when said blow pin assembly is lowered to position said blow pin tip within the neck finish defining portion of said hollow mold space, and b. a concave surface which provides a lip forming cavity with said split annular anvil for forge forming said dripless pour lip on the upper portion of said captured extruded tube when said blow pin assembly is lowered to position said blow pin tip within said neck finish defining portion of said hollow mold space, said concave surface being located between said inside diameter and said outside diameter of said groove.

2. The apparatus of claim 1 wherein said inside diameter of said groove is substantially equal to said outside diameter of said blow pin tip.

3. The apparatus of claim 2 wherein the lowest outsidemost extent of said groove lies in a plane closer to said split annular anvil than the plane in which the lowest insidemost extent of said groove lies.

4. The apparatus of claim 2 wherein said blow pin tip and said cutter are in abutment one with the other.

5. The apparatus of claim 1 wherein said cutter is fixedly mounted to said blow pin stem whereby rotation of said blow pin stem imparts like rotative motion to said cutter.

6. The apparatus of claim 1 wherein said groove has at least a portion having the shape of an inverted "U" when said groove is viewed in axial section.

* * * * *